United States Patent
Hirai et al.

(10) Patent No.: US 9,064,310 B2
(45) Date of Patent: Jun. 23, 2015

(54) POSITION ESTIMATION DEVICE, POSITION ESTIMATION METHOD, AND COMPUTER PROGRAM PRODUCT

(71) Applicants: Ryusuke Hirai, Tokyo (JP); Kenichi Shimoyama, Tokyo (JP); Takeshi Mita, Kanagawa (JP)

(72) Inventors: Ryusuke Hirai, Tokyo (JP); Kenichi Shimoyama, Tokyo (JP); Takeshi Mita, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 293 days.

(21) Appl. No.: 13/724,346

(22) Filed: Dec. 21, 2012

(65) Prior Publication Data
US 2013/0336539 A1 Dec. 19, 2013

(30) Foreign Application Priority Data
Jun. 15, 2012 (JP) .................................. 2012-136408

(51) Int. Cl.
G06T 7/00 (2006.01)

(52) U.S. Cl.
CPC .............. *G06T 7/004* (2013.01); *G06T 7/0044* (2013.01); *G06T 2207/10012* (2013.01); *G06T 2207/30201* (2013.01)

(58) Field of Classification Search
CPC ..... G06T 7/004; G06T 7/0044; G06T 7/0051; G06T 7/0061; G06T 7/0065; G06T 7/0075; G06T 2207/10012; G06K 2209/40
USPC ........ 382/106, 154, 286, 291; 356/4.01, 4.03, 356/20, 21, 625; 348/135, 139, 140
See application file for complete search history.

(56) References Cited

U.S. PATENT DOCUMENTS

2012/0121126 A1* 5/2012 Hwang et al. ................. 382/103

FOREIGN PATENT DOCUMENTS

| JP | 2011-217229 A | 10/2011 | ............. H04N 5/225 |
| JP | 4937424 B1 | 3/2012 | ............. H04N 13/04 |

OTHER PUBLICATIONS

Hirai, R. et al., "Image Processing Device, Method of Processing Image, and Image Display Apparatus," U.S. Appl. No. 13/360,062, filed Jan. 27, 2012.
Viola, P. et al., "Rapid Object Detection using a Boosted Cascade of Simple Features," IEEE Conference on Computer Vision and Pattern Recognition 2001, pp. 1-9, (2001).

* cited by examiner

*Primary Examiner* — Andrew W Johns
(74) *Attorney, Agent, or Firm* — Finnegan, Henderson, Farabow, Garrett & Dunner, L.L.P.

(57) ABSTRACT

According to an embodiment, a position estimation device includes first and second obtaining units, first and second calculators, and an estimating unit. The first obtaining unit is configured to obtain first data about a size and a position of an object in a first image. The second obtaining unit is configured to obtain second data about a distance to or a position of the object in a second image. The first calculator is configured to calculate, based on the first and second data, weights for first and second actual sizes of the object estimated respectively from the first and second data. The second calculator is configured to calculate a third actual size of the object by using the first and second actual sizes and the weights. The estimating unit is configured to estimate a three-dimensional position of the object by using the third actual size.

8 Claims, 8 Drawing Sheets

POSITION ESTIMATION DEVICE, POSITION ESTIMATION METHOD, AND COMPUTER PROGRAM PRODUCT

CROSS-REFERENCE TO RELATED APPLICATION

This application is based upon and claims the benefit of priority from Japanese Patent Application No. 2012-136408, filed on Jun. 15, 2012; the entire contents of which are incorporated herein by reference.

FIELD

Embodiments described herein relate generally to a position estimation device, a position estimation method, and a computer program product.

BACKGROUND

Typically, position estimation devices are known that estimate the three-dimensional position of a person in the real space on the basis of images of that person captured with the use of a visible camera as well as on the basis of an estimated distance to that person that is estimated with the use of a distance sensor.

Among such position estimation devices, some position estimation devices estimate the three-dimensional position of a person by detecting the face area of that person captured in images and by measuring the distance to the person with the use of a distance sensor that senses the direction corresponding to the face area.

However, the measurable range of a distance sensor is limited. Therefore, depending on the position of a person, it may not be possible to accurately estimate the three-dimensional position of that person.

Meanwhile, alternatively, some position estimation devices estimate the three-dimensional position of a person in the real space on the basis of images of that person captured with the use of two visible cameras (i.e., captured with the use of a stereo camera).

In such a position estimation device, based on the position of the face area of a person captured in each image, the three-dimensional position of that person is estimated by means of triangulation.

However, depending on the position of a person, there are times when that person is captured by only one of the two cameras. Hence, it may not be possible to accurately estimate the three-dimensional position of that person.

DETAILED DESCRIPTION

According to an embodiment, a position estimation device includes a first obtaining unit, a second obtaining unit, a first calculator, a second calculator, and an estimating unit. The first obtaining unit is configured to obtain first data related to a size of an object in a first image including the object captured therein and related to a position of the object in the first image. The second obtaining unit is configured to obtain second data either related to a distance to the object or related to a position of the object in a second image including the object captured therein. The first calculator is configured to calculate, based on the first data and the second data, weights with respect to a first actual size of the object estimated from the first data and with respect to a second actual size of the object estimated from the second data. The second calculator is configured to calculate a third actual size of the object by using the first actual size, the second actual size, and the weights. The estimating unit is configured to estimate a three-dimensional position of the object by using the third actual size.

Exemplary embodiments are described below in detail with reference to the accompanying drawings.

In the description and the drawings, the constituent elements identical to those referred to previously are referred to by the same reference numerals, and the detailed explanation thereof is not repeated.

First Embodiment

A position estimation device 1 according to a first embodiment can be used in stereoscopic image display devices such as televisions (TVs), personal computers (PCs), medical monitors, smartphones, and digital photo frames that enable watching stereoscopic images without having to wear special glasses. Moreover, the position estimation device 1 according to the first embodiment can also be used in digital cameras.

Figure 1:
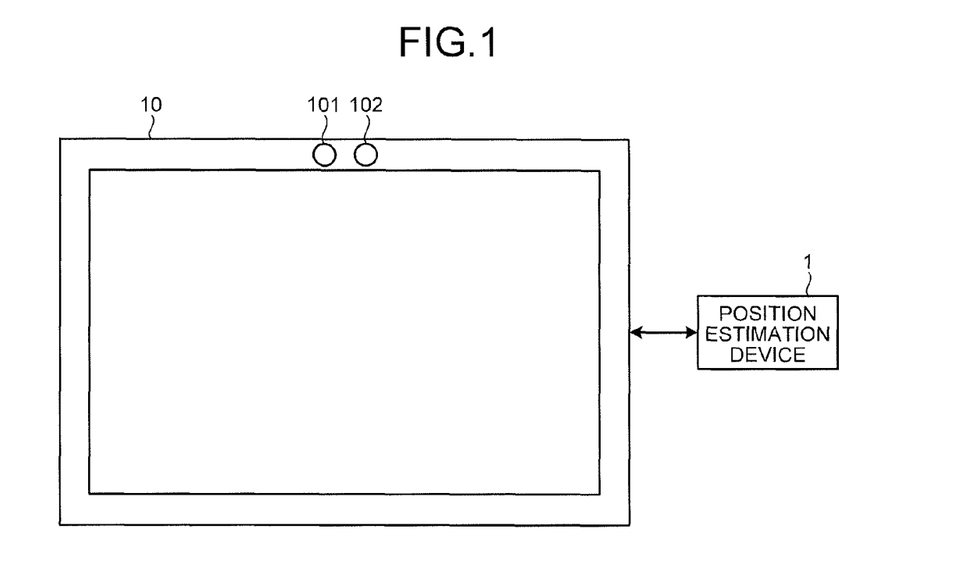
FIG. 1 is a diagram illustrating an exemplary manner of using a position estimation device according to a first embodiment.

As illustrated in FIG. 1, the position estimation device 1 estimates the three-dimensional position of a person with the use of a visible camera 101 and a distance sensor 102. For example, assume that the position estimation device 1 is used in a stereoscopic image display apparatus 10. In that case, based on the estimated three-dimensional position of a person (viewer), the stereoscopic image display apparatus 10 can control the visible range within which the viewer can view stereoscopic images.

Alternatively, for example, assume that the position estimation device 1 is used in a digital camera (not illustrated). In that case, based on the estimated position of a person (subject), the digital camera can control the focusing of lens.

The position estimation device 1 obtains first data related to the size of the face area of a person captured in an image by the visible camera 101. Moreover, the position estimation device 1 obtains second data related to the distance measured by the distance sensor 102 from the visible camera 101 to the person. Then, based on the first data and the second data, the position estimation device 1 calculates the actual size of the person and then estimates the three-dimensional position of that person according to the actual size.

Figure 2:
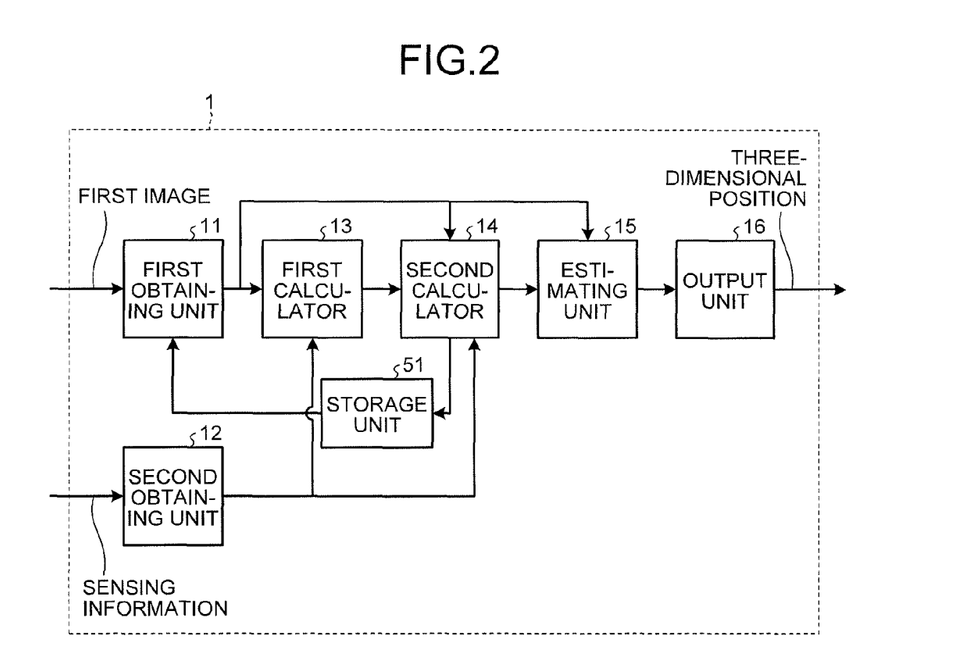
FIG. 2 is a block diagram of the position estimation device.

FIG. 2 is a block diagram of the position estimation device 1. Herein, the position estimation device 1 includes a first obtaining unit 11, a second obtaining unit 12, a first calculator 13, a second calculator 14, and an estimating unit 15.

The first obtaining unit 11 detects, from a first image captured by the visible camera 101, an area in which a person is captured (person area) and obtains first data related to the size and the position of the person area. Herein, the person area need not be the area which covers the entire person, but can be an area covering a part of the person (such as the face area). In the embodiments described herein, it is assumed that the person area points to the face area. Meanwhile, the first image can be a frame of a moving image captured by the visible camera 101. The first obtaining unit 11 sends the first data to the first calculator 13, the second calculator 14, and the estimating unit 15.

The second obtaining unit 12 obtains, from sensing information of the distance sensor 102, second data related to the distance to the person. Thus, the second data according to the first embodiment is related to the distance from the visible camera 101 to the person. The second obtaining unit 12 sends the second data to the first calculator and the second calculator 14.

Based on the first data and the second data, the first calculator 13 calculates weights corresponding to a first actual size of the person as estimated from the first data and corresponding to a second actual size of the person as estimated from the second data. Then, the first calculator 13 sends the calculated weights to the second calculator 14. Meanwhile, the explanation regarding the first actual size, the second actual size, and a third actual size is given later in detail.

Based on the first actual size and the second actual size, the second calculator 14 calculates a third actual size of the person, which is more accurate in nature. Then, the second calculator 14 sends the third actual size to the estimating unit 15 as well as writes the third actual size in a storage unit 51. The third actual size written in the storage unit 51 is used by the first obtaining unit 11 at the time of obtaining the first data at the next clock time and at clock times subsequent to the next clock time (described later).

From the actual size of the person and the first data, the estimating unit 15 calculates the three-dimensional position of the person. Then, the estimating unit 15 sends the estimated three-dimensional position to an output unit 16.

Subsequently, the output unit 16 outputs the estimated three-dimensional position to, for example, a stereoscopic image display device or a digital camera.

Meanwhile, the first obtaining unit 11, the second obtaining unit 12, the first calculator 13, the second calculator 14, the estimating unit 15, and the output unit 16 can be implemented with a central processing unit (CPU) and a memory used by the CPU.

This marks the end of the explanation regarding the configuration of the position estimation device 1.

Figure 3:
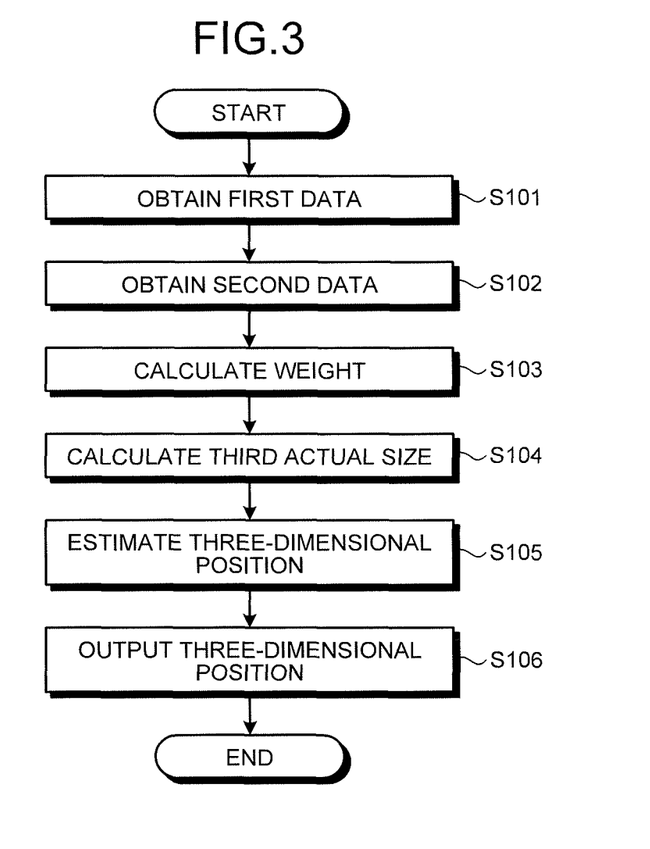
FIG. 3 is a flowchart for explaining a sequence of operations performed by the position estimation device.

FIG. 3 is a flowchart for explaining a sequence of operations performed by the position estimation device 1. The first obtaining unit 11 obtains the first data (Step S101) and the second obtaining unit 12 obtains the second data (Step S102).

Then, based on the first data and the second data, the first calculator 13 calculates weights corresponding to a first actual size of the person as estimated from the first data and corresponding to a second actual size of the person as estimated from the second data (Step S103). Based on the first actual size and the second actual size, the second calculator 14 calculates a third actual size of the person, which is more accurate in nature (Step S104). From the third actual size of the person and the first data, the estimating unit 15 calculates the three-dimensional position of the person (Step S105). Then, the output unit 16 outputs the estimated three-dimensional position (Step S106).

This marks the end of the explanation regarding the operations performed by the position estimation device 1.

Given below is the explanation regarding the configuration blocks according to the first embodiment.

Figure 4:
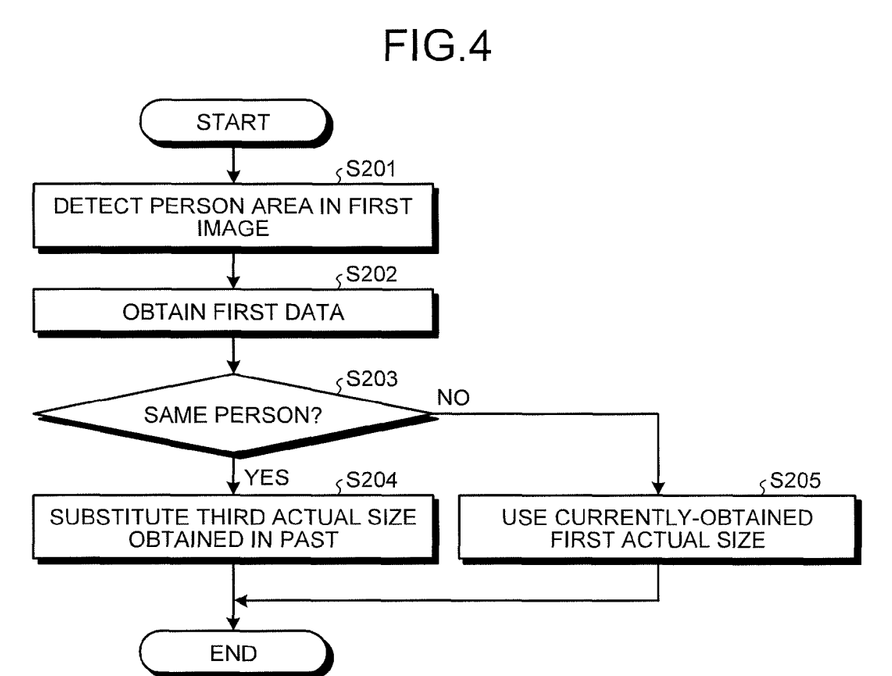
FIG. 4 is a flowchart for explaining a sequence of operations performed by a first obtaining unit in the position estimation device.

FIG. 4 is a flowchart for explaining a sequence of operations performed by the first obtaining unit 11. The first obtaining unit 11 detects a person area (the face area of a person) in the first image that is obtained (Step S201). For example, in the first image, the first obtaining unit 11 scans a search window for the purpose of detecting a person area, and obtains a plurality of rectangle features with respect to the image portion included within the search window. The first obtaining unit 11 can make use of a strong discriminator, which is formed by serially-connecting weak discriminators corresponding to the rectangle features, and can determine whether or not a person area is included within the search window. This method is disclosed in, for example, Paul Viola and Michael Jones, "Rapid Object Detection using a Boosted Cascade of Simple Features", IEEE conf., on Computer Vision and Pattern Recognition (CVPR 2001).

Meanwhile, in the first embodiment, when the abovementioned detection method is implemented for detecting person areas, each functional unit performing such detection (described later in detail) can be configured to include a pattern classifier, which has a cascade structure with a plurality of weak discriminators serially-connected and which is a cascade-type AdaBoost-based classifier as disclosed in Paul Viola and Michael Jones, "Rapid Object Detection using a Boosted Cascade of Simple Features", IEEE conf., on Computer Vision and Pattern Recognition (CVPR 2001).

More particularly, in the first image, the pattern classifier determines whether or not a face is present at the weak discriminator at each stage of the cascade. Then, only the image that is determined to have the face is sent to the next weak discriminator. The image that is determined to have the face at the last weak discriminator is finally determined as the image including the person area.

The strong discriminator that constitutes each stage of the cascade is configured by serially-connecting a plurality of weak discriminators. Each weak discriminator refers to the rectangle feature obtained with respect to the image within the search window and determines whether or not a person region is present within the search window.

Herein, if x represents a position vector of the two-dimensional coordinates in the image present within the search window, then the output of a weak discriminator n at the position vector x is expressed using Equation (1) given below.

$$h_n(x) = \begin{cases} 1 & \text{if } p_n f_n(x) < p_n \theta_n \\ -1 & \text{otherwise} \end{cases} \quad (1)$$

In Equation (1), $h_n(x)$ represents the output of the weak discriminator n; and $f_n(x)$ represents the judging function of the weak discriminator n. Moreover, $p_n$ represents a number either equal to 1 or equal to −1; and $\theta_n$ represents a predetermined threshold value set with respect to each weak discriminator n. For example, $\theta_n$ is set at the time of learning during discriminator creation.

Meanwhile, the output of a strong discriminator, which is formed by serially-connecting N number of weak discriminators, is expressed using Equation (2) given below.

$$H(x) = \sum_{n=1}^{N} \alpha_n h_n(x) \quad (2)$$

In Equation (2), H(x) represents the output of a strong discriminator that is formed by serially-connecting N number of weak discriminators. Moreover, in Equation (2), $\alpha_n$ represents a predetermined weight of the weak discriminator n; and $h_n$ represents the output of the weak discriminator n as expressed in Equation (1). For example, $\alpha_n$ is set at the time of learning during discriminator creation.

Regarding an image that has passed through a pattern classifier, a likelihood l(x) expressing face likelihood is calculated using Equation (3) given below.

$$l(x) = \frac{1}{1 + \exp(-aH(x))} \quad (3)$$

In Equation (3), a is a constant number representing the weight generated at the time of learning during discriminator creation. Moreover, in FIG. 3, H(x) represents the output of the strong discriminator.

Meanwhile, a person is not necessarily captured from a definite direction. For example, there can be times when a person is captured from a transverse direction or an oblique direction. In such a case, a pattern classifier that enables detection of the profile of a person can be used. Alternatively, a pattern classifier that deals with each of one or more postures of a person can be used.

Thus, at Step S201, the first obtaining unit 11 scans the entire first image using a search window of a predetermined size. Then, with the use of a pattern classifier of the above-mentioned type, the first obtaining unit 11 determines, at each scanning position, whether or not a person area is present in the image portion included within the search window. At that time, the first obtaining unit 11 scans the first image by making use of a plurality of search windows of different sizes. The information about each search window size is set in advance and can be held in the first obtaining unit 11.

In the first image, from the output value H(x) of the strong discriminator at each scanning position vector x scanned with each search window size, the first obtaining unit 11 obtains each search window size and obtains the likelihood l(x) at each scanning position vector x. The output value H(x) of the strong discriminator is calculated using Equation (2). Each search window size and the likelihood l(x) at each scanning position vector x is calculated using Equation (3).

Moreover, as the position (two-dimensional position) of the person area in the first image, the first obtaining unit 11 detects the position of the center in the search window having the search window size of the scanning position vector x having the highest likelihood l(x).

At Step S202, the first obtaining unit 11 obtains the first data with respect to the detected person area (Step S202). The first data contains the two-dimensional position and the size of the person area detected in the first image; contains the likelihood expressing the person area likelihood; and contains the first actual size (described later) of the person. The first obtaining unit 11 obtains the first data with respect to the first image at each clock time. Herein, regarding the first data with respect to the first image in which a person k is captured, a vector $S_k^{(t)}$ representing the first data at a clock time t is expressed using Equation (4) given below.

$$s_k^{(t)} = [x_k^{(t)} y_k^{(t)} w_k^{(t)} l_k^{(t)} W_k^{(t)}] \quad (4)$$

Figure 5:
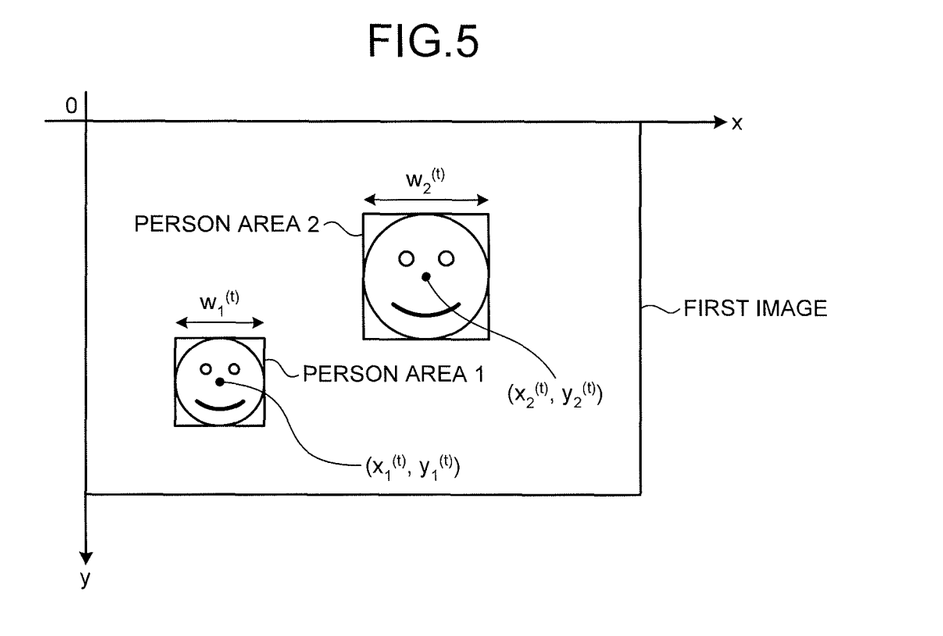
FIG. 5 is a diagram illustrating exemplary person areas.

FIG. 5 is a diagram illustrating exemplary person areas. Herein, in the first image that is captured by the visible camera 101, the top-left point serves as the origin. From the origin, the horizontal direction is set as the x-axis and the vertical direction is set as the y-axis. Then, regarding a person area 1 illustrated in FIG. 5, the two-dimensional position is expressed as the center $(x_1^{(t)}, y_1^{(t)})$ of the person area 1 and the size is expressed as $w_1^{(t)}$. Similarly, regarding a person area 2 illustrated in FIG. 5, the two-dimensional position is expressed as the center $(x_2^{(t)}, y_2^{(t)})$ of the person area 2 and the size is expressed as $w_2^{(t)}$.

Herein, $W_k^{(t)}$ represents the first actual size of a person. The first actual size $W_k^{(t)}$ can be set in advance as the average actual size corresponding to the size $w_k^{(t)}$ of the person area. In this case, in the first obtaining unit 11, the first actual size $W_k^{(t)}$ is held in advance. In this way, the first obtaining unit 11 holds the first data that is obtained for each clock time.

At Step S203, the first obtaining unit 11 compares the first data obtained with respect to the current first image and the first data obtained with respect to a past first image (such as the first image at the previous clock time), and determines whether or not the persons to which the two sets of first data correspond are the same person (Step S203). At that time, the first obtaining unit 11 reads the first data of a past clock time from the storage unit 51.

For example, depending on the degree of overlapping between the person area corresponding to past first data and the person area corresponding to the current first data, the first obtaining unit 11 determines whether the two person areas are of the same person. In this case, if the ratio of the overlapping area between two person areas is equal to or greater than a certain level (such as equal to or greater than 75%), then the two person areas can be determined to be of the same person.

If the two person areas are of the same person (Yes at Step S203), then the first obtaining unit 11 replaces the currently-obtained first actual size with the third actual size (described later) that was obtained for that person in the past (Step S204). For example, as illustrated in Equation (5) given below, the first obtaining unit 11 can replace the currently-obtained first actual size $W_k^{(t)}$ with a third actual size $W_k^{(t-1)}$ obtained at the previous clock time.

$$W_k^{(t)} \leftarrow W_k^{(t-1)} \quad (5)$$

On the other hand, if the two person areas are not of the same person (No at Step S203), then the first obtaining unit 11 uses the currently-obtained first actual size $W_k^{(t)}$ without modification in the first data (Step S205).

This marks the end of the explanation regarding the first obtaining unit 11.

Figure 6:
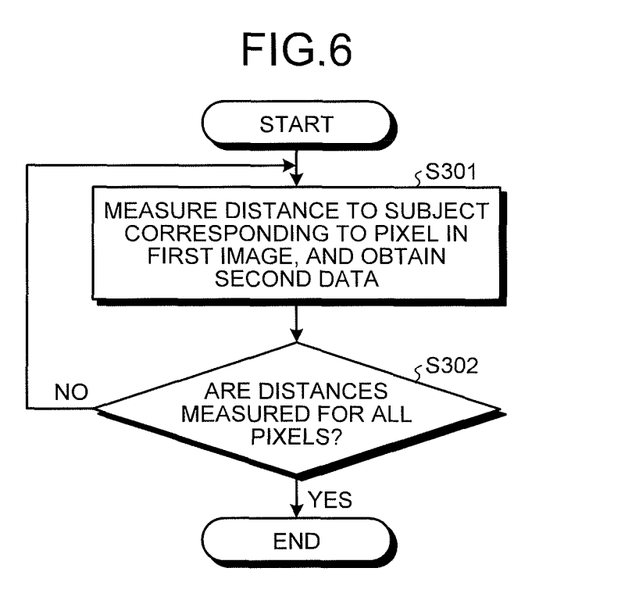
FIG. 6 is a flowchart for explaining a sequence of operations performed by a second obtaining unit in the position estimation device.

FIG. 6 is a flowchart for explaining a sequence of operations performed by the second obtaining unit 12. Herein, for each of at least one pixel included in the first image data captured by the visible camera 101, the second obtaining unit 12 measures the distance between the subject corresponding to that pixel and the visible camera 101 based on the sensing information of the distance sensor 102 (Step S301). Meanwhile, it is assumed that the orientation of the subject corresponding to the pixels in the first image is known.

In the coordinates illustrated in FIG. 5, regarding an object corresponding to the pixel at a position (x, y) at a clock time t, the distance is expressed as $d^{(t)}(x, y)$. Thus, in the first embodiment, the second data contains the distance $d^{(t)}(x, y)$.

Then, the second obtaining unit 12 determines whether or not the distance $d^{(t)}(x, y)$ is measured for all pixels in the first image (Step S302). If the distance $d^{(t)}(x, y)$ is not yet measured for all pixels in the first image (No at Step S302), then the system control returns to Step S301 and the second obtaining unit 12 measures the distance $d^{(t)}(x, y)$ for the next pixel. Once the distance $d^{(t)}(x, y)$ is measured for all pixels in the first image (Yes at Step S302), the operations are ended.

Meanwhile, the distance sensor 102 need not be capable of measuring the distances to the objects corresponding to all pixels. Regarding an object corresponding to a pixel for which the distance could not be measured, a value indicating incapability to measure (for example, "NULL") can be set (i.e., $d^{(t)}(x, y)$=NULL).

This marks the end of the explanation regarding the second obtaining unit 12.

The first calculator 13 obtains the first data and the second data; and, based on the distance $d^{(t)}(x, y)$ corresponding to a person area captured in the first image, calculates weights that corresponds to the first actual size of the person as estimated from the first data as well as corresponds to the second actual size of the person as estimated from the second data and that is used in calculating the third actual size of the person which is more accurate in nature. In the first embodiment, the first calculator 13 calculates the weights according to the degree of reliability of the second data. That is, the lower the degree of reliability of the second data, the relatively greater is the weight with respect to the first actual size. Explained below is the method of calculating a weight $\lambda_k^{(t)}$ corresponding to the second actual size.

In the first embodiment, the weight $\lambda_k^{(t)}$ is expressed as a real number in the range from 0 to 1. The greater the number of pixels (x, y) for which the distance $d^{(t)}(x, y)$ related to the person area of the person k in the second data is not NULL (i.e., the greater the number of pixels (x, y) for which the second-image data can be measured), the closer the weight $\lambda_k^{(t)}$ gets to 1. For example, the weight $\lambda_k^{(t)}$ can be expressed using Equation (6) given below.

$$\lambda_k^{(t)} = \begin{cases} 1 & \text{if } \frac{1}{N} \sum_{(x,y) \in \Omega_k} \text{If } (d^{(t)}(x, y) \neq \text{NULL}) \geq th1 \\ 0 & \text{otherwise} \end{cases} \quad (6)$$

Herein, $\Omega_k$ represents the coordinates of pixels included in the person area of the person k captured in the first image. N represents the number of pixels included in the set $\Omega_k$. A function If(a≠b) sets 1 if a and b have different values; and sets 0 if a and b do not have different values. Moreover, th1 represents a real number in the range of 0≤th1≤1. The greater the volume of obtainable second data, the greater is the value of th1.

Thus, in the present example, when the number of pixels for which the second data can be measured reaches a certain number in the person area of the person k; the degree of reliability becomes equal to 1.

This marks the end of the explanation regarding the first calculator 13.

The second calculator 14 obtains the first data, the second data, and the weight $\lambda_k^{(t)}$; and calculates the third actual size by referring to the first actual size $W_k^{(t)}$ estimated from the first data, a second actual size $\hat{W}_k^{(t)}$ estimated from the second data, and the weight $\lambda_k^{(t)}$.

Figure 7:
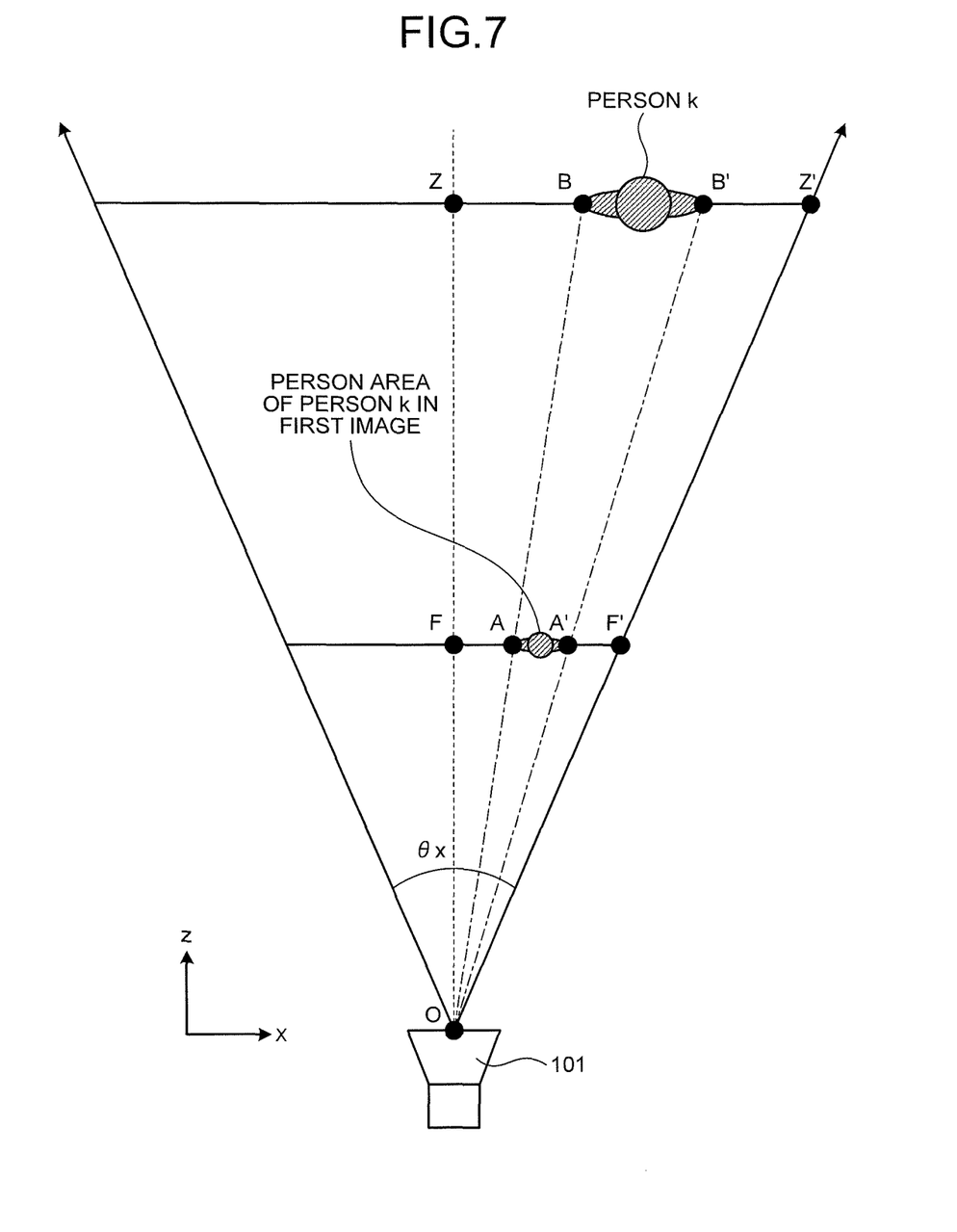
FIG. 7 is an explanatory diagram for explaining the positional relationship between a visible camera in the position estimation device and a person as well as for explaining the size of the person.

FIG. 7 is an explanatory diagram for explaining the positional relationship between the visible camera 101 and a person as well as for explaining the size of the person. In FIG. 7, the geometric relation between the visible camera 101 and the person k is illustrated on the xz plane. In the present example, the visible camera 101 is installed at a point O. The visible camera 101 makes an angle of $\theta_x$ in the x-axis direction. The first image has a focal point F in the z-axis direction. The person k is positioned at a position Z in the z-axis direction. Moreover, the size $w_k^{(t)}$ of the person area of the person k in the first data is assumed to be AA'; the actual size of the person k is assumed to be BB'; and the distance from the visible camera 101 to the person k is assumed to be OZ.

If $I_w$ represents the horizontal resolution of the first image captured by the visible camera 101, then a distance OF can be expressed using Equation (7) given below.

$$OF = \frac{I_w}{2 \tan(\theta_x / 2)} \quad (7)$$

Thus, OF is a constant number determined according to the specifications of the camera.

Regarding AA', BB', OF, and OZ; the relationship of AA':BB'=OZ:OF is satisfied. Based on the first data, that relationship can be expressed using Equation (8) given below.

$$Z_k^{(t)} = \frac{OF}{w_k^{(t)}} W_k^{(t)} \quad (8)$$

Herein, $Z_k^{(t)}$=OZ is satisfied.

Figure 8:
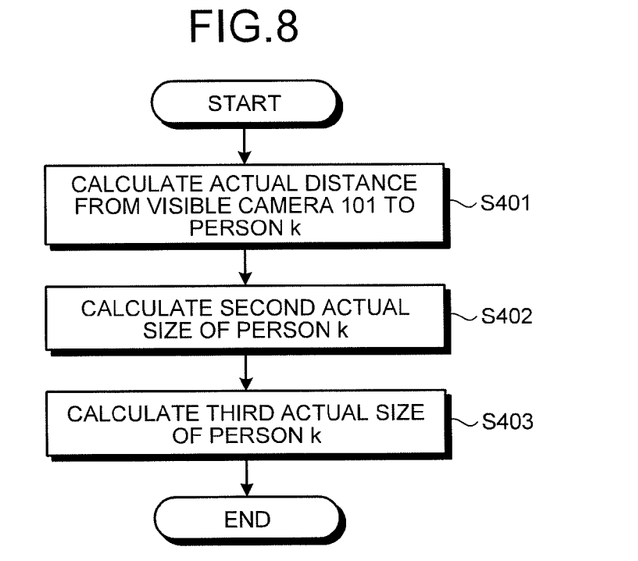
FIG. 8 is a flowchart for explaining a sequence of operations performed by a second calculator in the position estimation device.

FIG. 8 is a flowchart for explaining a sequence of operations performed by the second calculator 14. Firstly, based on the first data and the second data, the second calculator 14 calculates an actual distance $\hat{Z}_k^{(t)}$ from the visible camera 101 to the person k (Step S401).

For example, the second calculator 14 can calculate the actual distance $\hat{Z}_k^{(t)}$ using Equation (9) given below.

$$\hat{Z}_k^{(t)} = \frac{1}{N} \sum_{(x,y) \in \Omega_k} d^{(t)}(x, y) \quad (9)$$

Herein, $\Omega_k$ represents the set of those pixels in the person area of the person k for which $d^{(t)}(x, y)$≠NULL is satisfied; and N represents the number of pixels included in the set $\Omega_k$.

Meanwhile, as the actual distance $\hat{Z}_k^{(t)}$, the second calculator 14 can alternatively calculate an intermediary value or the average value of $d^{(t)}(x, y)$ included in $\Omega_k$. Still alternatively, as illustrated in Equation (10) given below, the second calculator 14 can calculate the actual distance $\hat{Z}_k^{(t)}$ using a weighted average in which, the closer the distance-related information in the second data is from the person area in the first data, the greater is the attached weight.

$$\hat{Z}_k^{(t)} = \frac{\sum_{(x,y)\in\Omega_k} \exp\left\{-\frac{1}{2\sigma_k^2}\{(x-x_k^{(t)})^2 + (y-y_k^{(t)})^2\}\right\} d^{(t)}(x,y)}{\sum_{(x,y)\in\Omega_k} \exp\left\{-\frac{1}{2\sigma_k^2}\{(x-x_k^{(t)})^2 + (y-y_k^{(t)})^2\}\right\}} \quad (10)$$

Herein, $\sigma_k$ is a variable that varies according to the size of the person area of the person k and is obtained by dividing $w_k(t)$, which is included in the first data, by 2.

Subsequently, from the first data and the actual distance $\hat{Z}_k^{(t)}$, the second calculator 14 calculates the second actual size $\hat{W}_k^{(t)}$ of the person k (Step S402). For example, the second calculator 14 can calculate the second actual size $\hat{W}_k^{(t)}$ using Equation (11) given below.

$$\hat{w}_k^{(t)} = \frac{W_k^{(t)}}{OF} \hat{Z}_k^{(t)} \quad (11)$$

Then, from the first actual size $W_k^{(t)}$, the second actual size $\hat{W}_k^{(t)}$, and the weight $\lambda_k^{(t)}$; the second calculator 14 calculates the third actual size of the person, which is more accurate in nature (Step S403). For example, the second calculator 14 can calculate the third actual size using Equation (12) given below. Subsequently, the second calculator 14 writes the third actual size in the storage unit 51.

$$W_k^{(t)} \leftarrow (1-\lambda_k^{(t)})W_k^{(t)} + \lambda_k^{(t)}\hat{W}_k^{(t)} \quad (12)$$

Herein, the left side of Equation (12) represents the third actual size.

The estimating unit 15 estimates a three-dimensional position of the person k with respect to the visible camera 101. The position $Z_k^{(t)}$ in the z-axis direction of the person k is obtained using Equation (8). If $X_k^{(t)}$ represents the position in the x-axis direction and $Y_k^{(t)}$ represents the position in the y-axis direction, then the estimating unit 15 can obtain $X_k^{(t)}$ and $Y_k^{(t)}$ using Equation (13) given below.

$$X_k^{(t)} = \frac{W_k^{(t)}}{w_k^{(t)}} x_k^{(t)} \quad (13)$$

$$Y_k^{(t)} = \frac{W_k^{(t)}}{w_k^{(t)}} y_k^{(t)}$$

In the first embodiment, although the explanation is given with reference to a person as the object, it is not the only possible case. For example, any other object such as an animal or a vehicle that can be detected from the first image can be taken into consideration.

As described above, according to the first embodiment, it becomes possible to accurately estimate the three-dimensional position of a target object.

Generally, the distance sensor 102 has a range within which it can measure the distance to a person. For example, if the distance sensor 102 and the person are closer to each other than a certain distance, then the distance sensor 102 cannot obtain the distance to that person. In the first embodiment, the position estimation device 1 can estimate the three-dimensional position of a person by referring to the actual size of that person obtained in the past and the first data obtained at present. For that reason, even in the case when the distance sensor 102 cannot correctly measure the distance, it becomes possible to accurately estimate the three-dimensional position of the person.

Modification

The weight $\lambda_k^{(t)}$ according to the first embodiment can also be calculated using Equation (14) given below.

$$\lambda_k^{(t)} = \begin{cases} 1 & \text{if } \sum_{(x,y)\in\Omega_k} \frac{1}{2\pi\sigma_k^2} \exp\left\{-\frac{1}{2\sigma_k^2}\{(x-x_k^{(t)})^2 + (y-y_k^{(t)})^2\}\right\} \geq th2 \\ 0 & \text{otherwise} \end{cases} \quad (14)$$

Herein, $\Omega_k$ represents the set of those pixels in the person area of the person k for which $d^{(t)}(x,y) \neq$ NULL is satisfied in the first image. Here, $\sigma_k$ is a variable that varies according to the size of the person area of the person k and is obtained by dividing $w_k^{(t)}$, which is included in the first data, by 2; th2 represents a predetermined real number in the range of $0 \leq th2 \leq 1$.

Alternatively, the weight $\lambda_k^{(t)}$ according to the first embodiment can also be calculated using Equation (15 given below.

$$\lambda_k^{(t)} = \sum_{(x,y)\in\Omega_k} \frac{1}{2\pi\sigma_k^2} \exp\left\{-\frac{1}{2\sigma_k^2}\{(x-x_k^{(t)})^2 + (y-y_k^{(t)})^2\}\right\} \quad (15)$$

Herein, the variables or the like are identical to Equation (14).

Second Embodiment

Figure 9:
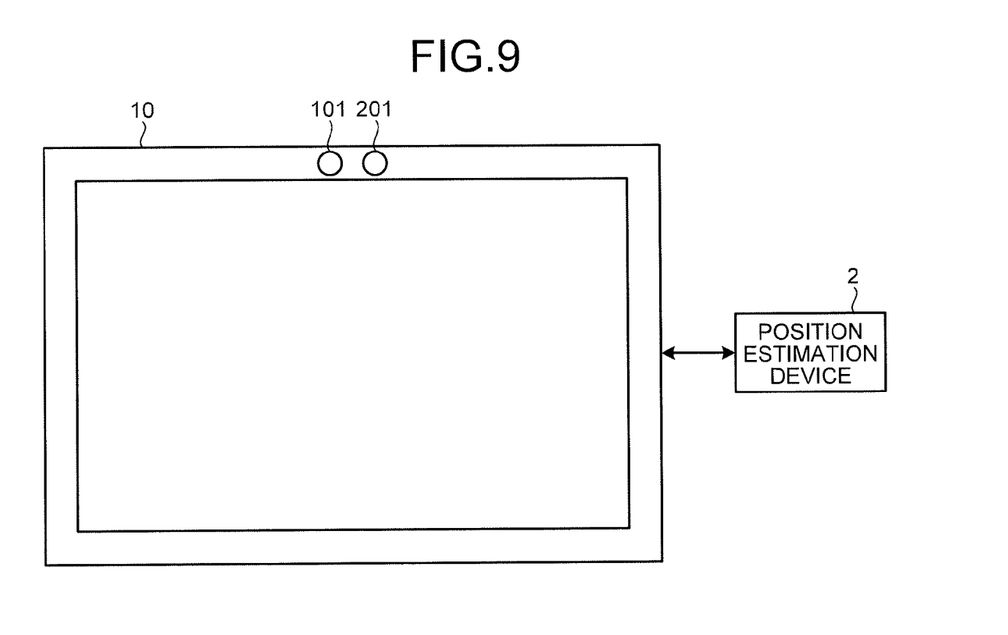
FIG. 9 is a diagram illustrating an exemplary manner of using a position estimation device according to a second embodiment.

As illustrated in FIG. 9, a position estimation device 2 according to a second embodiment differs from the first embodiment in the fact that the second data related to the distance to a person is obtained not by the distance sensor 102 but by a visible camera 201. Herein, the position estimation device 2 according to the second embodiment estimates the three-dimensional position of a person using a stereo camera that is made of the visible camera 101 and the visible camera 201. It is assumed that the visible camera 201 has known epipolar geometry with the visible camera 101. The epipolar geometry can be obtained by implementing the calibration method of a commonly-used stereo camera.

A block diagram of the position estimation device 2 is identical to the block diagram of the position estimation device 1. Hence, the explanation thereof is not repeated. However, in the position estimation device 2; the operations performed by the second obtaining unit 12, the first calculator 13, and the second calculator 14 are mainly different than the operations performed in the position estimation device 1.

Figure 10:
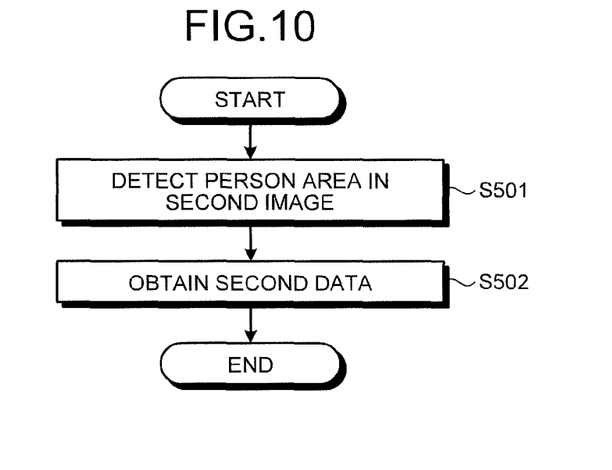
FIG. 10 is a flowchart for explaining a sequence of operations performed by the second obtaining unit according to the second embodiment.

FIG. 10 is a flowchart for explaining a sequence of operations performed by the second obtaining unit 12 according to the second embodiment. Firstly, the second obtaining unit 12 detects a person area captured in the second image by the visible camera 201 (Step S501). The method of detection can be identical to that implemented by the first obtaining unit 11.

Then, the second obtaining unit 12 obtains the second data (Step S502). In the second embodiment, the second data is related to the position of the person area detected in the second image by implementing the same search method as that implemented by the first obtaining unit 11. Herein, at the clock time t, a vector $\hat{s}_k^{(t)}$ representing the second data of the person area of the person k is expressed using Equation (16) given below.

$$\hat{s}_k^{(t)} = [\hat{x}_k^{(t)} \ \hat{y}_k^{(t)} \ \hat{w}_k^{(t)} \ \hat{l}_k^{(t)}] \quad (16)$$

Herein, the person k is same as the person k referred to in Equation (4). For example, the second obtaining unit 12 can determine whether or not the person captured by the visible camera 101 is same as the person captured by the visible camera 201. For that, the second obtaining unit 12 can determine the degree of similarity between the pixel values included in the person area in the first image and the pixel values included in the person area in the second image.

The first calculator 13 can calculate the weight $\lambda_k^{(t)}$ with respect to the second data using Equation (17) given below.

$$\lambda_k^{(t)} = \hat{1}_k^{(t)} \quad (17)$$

Thus, the higher the likelihood included in the second data of the person k captured in the second image, the greater becomes the weight $\lambda_k^{(t)}$ with respect to the second data. Alternatively, the first calculator 13 can calculate the weight $\lambda_k^{(t)}$ with respect to the second data using Equation (18) given below.

$$\lambda_k^{(t)} = \begin{cases} 1 & \text{if } \hat{1}_k^{(t)} \geq th3 \\ 0 & \text{otherwise} \end{cases} \quad (18)$$

Herein, th3 represents a real number in the range of 0 to 1.

Meanwhile, in case the person k is present at a blind spot of the visible camera 201 and if the person k is not detected by implementing the abovementioned search method, the first calculator 13 can set 0 as the weight $\lambda_k^{(t)}$ with respect to the second data.

The second calculator 14 refers to the two-dimensional position of the person k specified in the first data and the two-dimensional position of the person k specified in the second data, and calculates the actual distance $\hat{Z}_k^{(t)}$ to the person k by means of triangulation. Then, the second calculator 14 refers to the first data and the actual distance $\hat{Z}_k^{(t)}$, and accordingly calculates the second actual size $\hat{W}_k^{(t)}$ of the person k. Subsequently, from the first actual size $W_k^{(t)}$, the second actual size e), and the weight $\lambda_k^{(t)}$; the second calculator 14 calculates the third actual size of the person k, which is more accurate in nature.

For example, the second calculator 14 can calculate the third actual size of the person k by implementing the method explained below.

For example, assume that a tentative three-dimensional position of the person k is expressed using Equation (19) given below.

$$[\hat{x}_k^{(t)} \hat{y}_k^{(t)} \hat{Z}_k^{(t)}] \quad (19)$$

A position vector $u_{k,1}$ of the person k captured in the first image is expressed using Equation (20) given below.

$$u_{k,1}^{(t)} = [x_k^{(t)} y_k^{(t)} 1]^T \quad (20)$$

A position vector $u_{k,2}$ of the person k captured in the second image is expressed using Equation (21) given below.

$$u_{k,1}^{(t)} = [\hat{x}_k^{(t)} \hat{y}_k^{(t)} 1]^T \quad (21)$$

The tentative three-dimensional position of the person k in the real space is expressed in a homogenous coordinate system as given below in Equation (22).

$$U_k^{(t)} = [\hat{X}_k^{(t)} \hat{Y}_k^{(t)} \hat{Z}_k^{(t)} 1]^T \quad (22)$$

In Equations given above, T represents transposition. With that, relational expressions can be obtained as given below in Equation (23) and Equation (24).

$$\alpha u_{k,1}^{(t)} = P U_k^{(t)} \quad (23)$$

$$\beta u_{k,2}^{(t)} = Q U_k^{(t)} \quad (24)$$

In Equation (23), α represents the camera scale of the visible camera 101 at the time of capturing images. Similarly, in Equation (24), β represents the camera scale of the visible camera 201 at the time of capturing images. Moreover, in Equation (23), P represents a projection matrix from a point in the real space (in the three-dimensional coordinate system) to the first image. Similarly, in Equation (24), Q represents a projection matrix from a point in the real space (in the three-dimensional coordinate system) to the second image. These projection matrices are obtained by performing, in advance, calibration of the visible camera 101 and the visible camera 201, and can be held in advance by the second calculator 14.

Then, from Equation (23) and Equation (24), a system of Equation given below in Equation (25) is obtained.

$$\begin{bmatrix} -p_{00} + p_{20}x_k^{(t)} & -p_{01} + p_{21}x_k^{(t)} & -p_{02} + p_{22}x_k^{(t)} \\ -p_{10} + p_{20}y_k^{(t)} & -p_{11} + p_{21}y_k^{(t)} & -p_{12} + p_{22}y_k^{(t)} \\ -q_{00} + q_{20}\hat{x}_k^{(t)} & -q_{01} + q_{21}\hat{x}_k^{(t)} & -q_{02} + q_{22}\hat{x}_k^{(t)} \\ -q_{10} + q_{20}\hat{y}_k^{(t)} & -q_{00} + q_{21}\hat{y}_k^{(t)} & -q_{00} + q_{22}\hat{y}_k^{(t)} \end{bmatrix} \quad (25)$$

$$\begin{bmatrix} \hat{X}_k^{(t)} \\ \hat{Y}_k^{(t)} \\ \hat{Z}_k^{(t)} \end{bmatrix} = \begin{bmatrix} p_{03} - p_{23}x_k^{(t)} \\ p_{13} - p_{23}y_k^{(t)} \\ q_{03} - q_{23}\hat{x}_k^{(t)} \\ q_{13} - q_{23}\hat{y}_k^{(t)} \end{bmatrix}$$

The second calculator 14 implements the method of least squares to obtain a pseudo inverse matrix of the matrix on the left side in Equation (25), and calculates the tentative three-dimensional position of the person k.

The z-coordinate at the tentative three-dimensional position of the person k is the actual distance $\hat{Z}_k^{(t)}$ according to the second embodiment.

Then, in an identical manner to the first embodiment, the second calculator 14 calculates the second actual size $\hat{W}_k^{(t)}$ of the person k by referring to the first data and the actual distance $\hat{Z}_k^{(t)}$. Then, from the first size $W_k^{(t)}$, the second size $\hat{W}_k^{(t)}$, and the weight $\lambda_k^{(t)}$; the second calculator 14 calculates the third actual size.

Thus, according to the second embodiment, even in the case when a stereo camera is used, it becomes possible to accurately estimate the three-dimensional position of an object.

Third Embodiment

Generally, at the time of detecting a person area (such as a face area) using a visible camera, there are times when an error occurs in the detected position of the person area due to the effect of noise that gets mixed in the image or due to the effect of a decrease in the dynamic range of the image (when the image is captured at a dark place). In contrast, the infrared light is not affected even in a dark place thereby making it possible to perform measurement in a stable manner.

Figure 11:
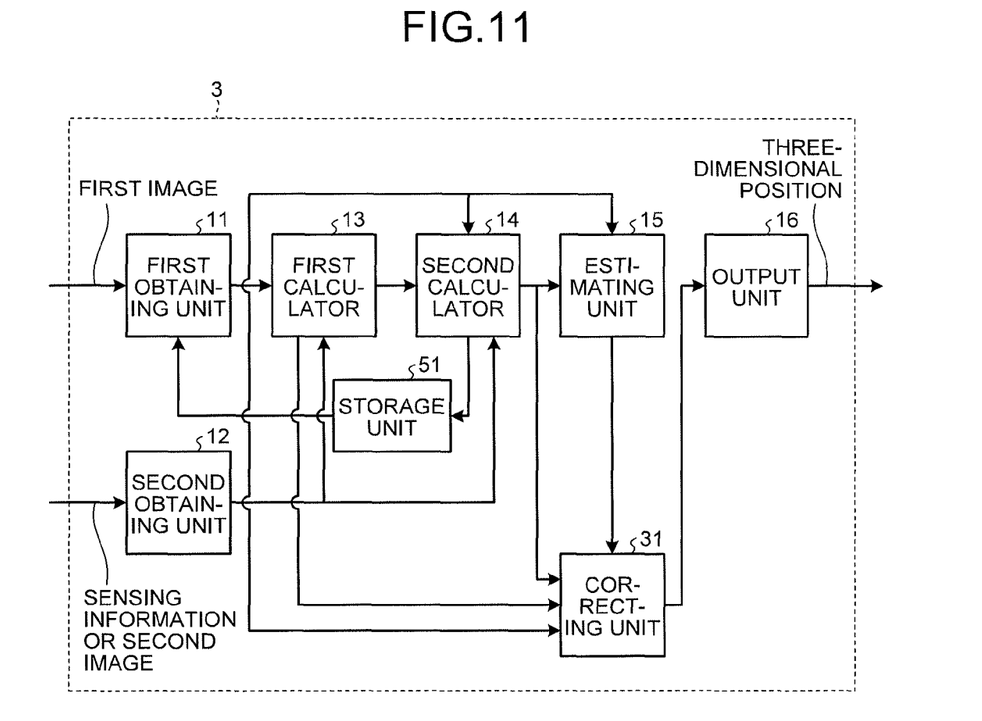
FIG. 11 is a block diagram of a position estimation device according to a third embodiment.

A position estimation device 3 according to a third embodiment differs from the embodiments described above in the fact that, when there is an error in the size of the person area at the time of detecting a person, the position estimation device 3 corrects the three-dimensional position of that person with the use of the actual distance W.

FIG. 11 is a block diagram of the position estimation device 3. In addition to the position estimation device 1, the position estimation device 3 further includes a correcting unit 31. Herein, the estimating unit 15 sends the estimated three-dimensional position to the correcting unit 31.

The correcting unit 31 obtains the three-dimensional position of the person k from the estimating unit 15; obtains the weight $\lambda_k^{(t)}$ from the first calculator 13; obtains the first data from the first obtaining unit 11; obtains the actual distance $\hat{Z}_k^{(t)}$ from the second calculator 14; and accordingly corrects the three-dimensional position of the person k. For example, the correcting unit 31 can correct the actual distance $\hat{Z}_k^{(t)}$, which is the z-coordinate at the three-dimensional position of the person k, using Equation (26) given below.

$$Z_k^{(t)} \leftarrow \lambda_k^{(t)} \hat{Z}_k^{(t)} + (1 - \lambda_k^{(t)}) Z_k^{(t)} \tag{26}$$

Then, according to the corrected actual distance $\hat{Z}_k^{(t)}$, the correcting unit 31 can correct the x-coordinate and the y-coordinate at the three-dimensional position of the person k using Equation (27) given below.

$$X_k^{(t)} \leftarrow \lambda_k^{(t)} \frac{x_k^{(t)}}{OF} Z_k^{(t)} + (1 - \lambda_k^{(t)}) X_k^{(t)} \tag{27}$$

$$Y_k^{(t)} \leftarrow \lambda_k^{(t)} \frac{y_k^{(t)}}{OF} Z_k^{(t)} + (1 - \lambda_k^{(t)}) Y_k^{(t)}$$

Herein, OF is a constant number identical to that used in Equation (7) and is determined according to the specifications of the camera.

Thus, according to the third embodiment, it becomes possible to estimate the three-dimensional position of an object with more accuracy.

Fourth Embodiment

Figure 12:
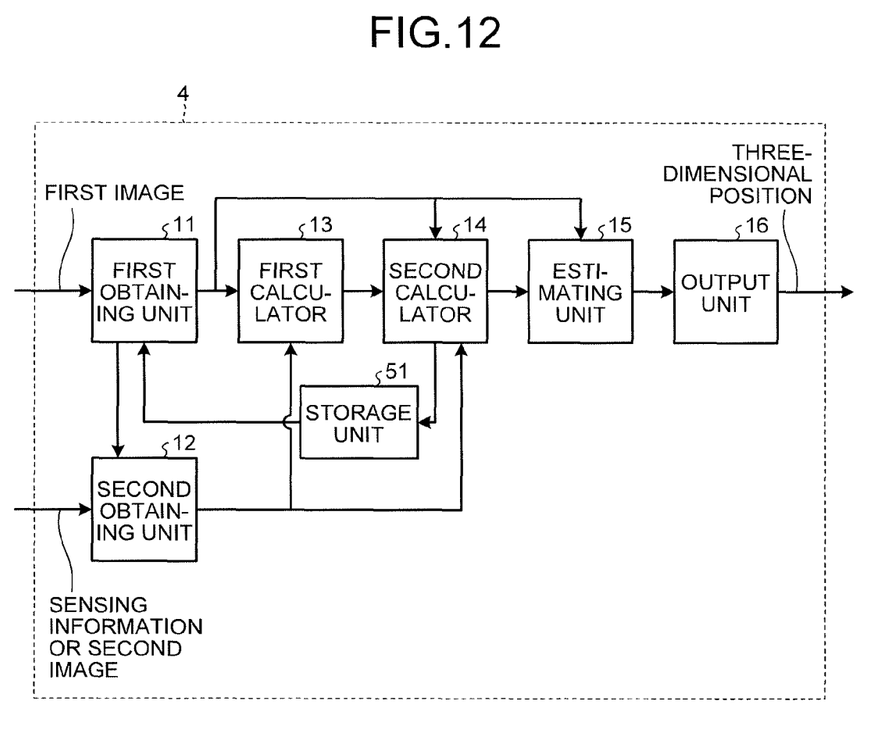
FIG. 12 is a block diagram of a position estimation device according to a fourth embodiment.

A position estimation device 4 according to a fourth embodiment differs from the embodiments described above in the fact that the second obtaining unit 12 obtains the second data by additionally referring to a detected position of a person included in the first data.

FIG. 12 is a block diagram of the position estimation device 4. As compared to the position estimation device 1, the first obtaining unit 11 of the position estimation device 4 sends the first data to the second obtaining unit 12.

In the case when the second obtaining unit 12 uses a distance sensor, the information about distances within the person area can be obtained using a sensor probe for emitting infrared light in the direction of the person indicated by the person area.

In the case when the second obtaining unit 12 uses the visible camera 201, the range in which the second obtaining unit 12 performs scanning using a search window can be limited to the epipolar line that passes through the person area detected in the first image by the first obtaining unit 11.

In this way, it becomes possible to estimate the three-dimensional position of an object in an efficient and accurate manner.

Fifth Embodiment

In a fifth embodiment, the explanation is given for a case in which the position estimation device 1 is used in the stereoscopic image display apparatus 10. Herein, based on the estimated three-dimensional position of a person, the stereoscopic image display apparatus 10 controls the visible range within which a viewer can view stereoscopic images.

The stereoscopic image display apparatus 10 includes a visible range control unit (not illustrated) that controls the visible range according to the estimated three-dimensional position of a person.

In the stereoscopic image display apparatus 10 that does not require viewers to wear special glasses, a parallax barrier or a lenticular lens can be installed facing a display panel so that a plurality of viewpoint images having different viewpoints are displayed as stereoscopic images to the viewer.

In the stereoscopic image display apparatus 10, depending on the viewing position of a viewer, there exists a pseudoscopic area in which, with respect to the viewpoint images viewed by the right eye, the left eye happens to view the viewpoint images on the relatively right side. That causes limitation to the visible range. That visible range is determined according to the design value of the stereoscopic image display apparatus 10.

In that case, for example, the visible range can be changed by interchanging the viewpoint images viewed by the left eye and the viewpoint images viewed by the right eye.

The visible range control unit (not illustrated) changes the visible range in such a way that the three-dimensional position estimated by the position estimation device 1 lies within the visible range.

As a result, when the position estimation device 1 is used in the stereoscopic image display apparatus 10, the viewer can view good quality stereoscopic images.

Meanwhile, each position estimation device described above can also be put into practice with the use of a general-purpose computer device that serves as the basic hardware. That is, the first obtaining unit 11, the second obtaining unit 12, the first calculator 13, the second calculator 14, the estimating unit 15, the output unit 16, and the correcting unit 31 can be implemented by running computer programs in a processor installed in the computer device. At that time, the position estimation device can be put into practice by installing in advance the computer programs in the computer device. Alternatively, the position estimation device can be put into practice by storing the computer programs in a memory medium such as a compact disk read only memory (CD-ROM) or by distributing the computer programs via a network as a computer program product, and then appropriately installing the computer programs in the computer device. Moreover, the first obtaining unit 11, the second obtaining unit 12, the first calculator 13, the second calculator 14, the estimating unit 15, the output unit 16, the correcting unit 31, and the storage unit 51 can be implemented with the use of a memory medium such as a memory that is embedded in the computer device or attached to the computer device from outside; a hard disk; a compact disk recordable (CD-R), a compact disk rewritable (CD-RW)), a digital versatile disk random access memory (DVD-RAM), and a digital versatile disk recordable (DVD-R).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position estimation device comprising:
   a processor that:
   obtains first data related to a size of an object in a first image including the object captured therein and related to a position of the object in the first image;
   obtains second data either related to a distance to the object or related to a position of the object in a second image including the object captured therein;

calculates, based on the first data and the second data, weights with respect to a first actual size of the object estimated from the first data and with respect to a second actual size of the object estimated from the second data;

calculates a third actual size of the object by using the first actual size, the second actual size, and the weights; and estimates a three-dimensional position of the object by using the third actual size.

2. The device according to claim 1, wherein the processor calculates the weights according to a degree of reliability of the second data.

3. The device according to claim 2, wherein the processor obtains the second data for each pixel in the first image or for each pixel in the second image, and calculates the weights so that the smaller the number of pixels for which the second data is obtained, the greater the weights with respect to the first data.

4. The device according to claim 1, further comprising a memory configured to store the third actual size at each clock time, wherein the processor calculates the first actual size at the current clock time by further using the third actual size at a clock time in the past.

5. The device according to claim 1, wherein the processor calculates the second data by using the first data.

6. The device according to claim 1, wherein the processor further corrects the estimated three-dimensional position of the object according to the weights.

7. A position estimation method comprising:

obtaining first data related to a size of an object in a first image including the object captured therein and related to a position of the object in the first image;

obtaining second data either related to a distance to the object or related to a position of the object in a second image including the object captured therein;

calculating, based on the first data and the second data, weights with respect to a first actual size of the object estimated from the first data and with respect to a second actual size of the object estimated from the second data;

calculating a third actual size of the object by using the first actual size, the second actual size, and the weights; and estimating a three-dimensional position of the object by using the third actual size.

8. A computer program product comprising a non-transitory computer-readable medium containing a position estimating program executed by a computer, the program causing the computer to execute:

obtaining first data related to a size of an object in a first image including the object captured therein and related to a position of the object in the first image;

obtaining second data either related to a distance to the object or related to a position of the object in a second image including the object captured therein;

calculating, based on the first data and the second data, weights with respect to a first actual size of the object estimated from the first data and with respect to a second actual size of the object estimated from the second data;

calculating a third actual size of the object by using the first actual size, the second actual size, and the weights; and estimating a three-dimensional position of the object by using the third actual size.

* * * * *